United States Patent
Slezak et al.

(10) Patent No.: US 9,280,494 B2
(45) Date of Patent: Mar. 8, 2016

(54) SYSTEM METHOD FOR ASSOCIATING AN APPLICATION RUNNNG ON COMPUTING SYSTEM BY SELECTIVELY ALTERING AN ATTRIBUTE OF THE INPUT AND OUTPUT OF CONNECTED PERIPHERAL DEVICE

(71) Applicant: Microsoft Technology Licensing, LLC, Redmond, WA (US)

(72) Inventors: Mark Slezak, Kirkland, WA (US); Alain Michaud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/908,975

(22) Filed: Jun. 3, 2013

(65) Prior Publication Data
US 2013/0339553 A1   Dec. 19, 2013

Related U.S. Application Data

(63) Continuation of application No. 12/142,818, filed on Jun. 20, 2008, now abandoned.

(51) Int. Cl.
*G06F 13/00* (2006.01)
*G06F 3/00* (2006.01)
*G06F 13/10* (2006.01)
*G06F 3/038* (2013.01)

(52) U.S. Cl.
CPC .............. *G06F 13/102* (2013.01); *G06F 3/038* (2013.01)

(58) Field of Classification Search
CPC ................................ G06F 13/102; G06F 3/038
USPC .............. 710/8–10, 62, 63, 67, 72, 260, 261, 710/15–19, 14, 64; 84/645; 341/27; 345/168, 170
See application file for complete search history.

(56) References Cited

U.S. PATENT DOCUMENTS

| | | | |
|---|---|---|---|
| 4,897,651 | A | 1/1990 | DeMonte |
| 5,694,562 | A | 12/1997 | Fisher |
| 5,818,361 | A | 10/1998 | Acevedo |
| 5,825,362 | A | 10/1998 | Retter |
| 5,828,034 | A | 10/1998 | Chang |
| 6,004,049 | A | 12/1999 | Knox |

(Continued)

FOREIGN PATENT DOCUMENTS

JP          2004318457 A          11/2004

OTHER PUBLICATIONS

Non-Final Office Action cited in U.S. Appl. No. 12/142,818 dated Sep. 17, 2010, 12 pgs.

(Continued)

*Primary Examiner* — Tammara Peyton
(74) *Attorney, Agent, or Firm* — Sunah Lee; Doug Barker; Micky Minhas (57) ABSTRACT

A method on a computing system for associating an output of a coupled peripheral device to an input of the peripheral device is provided. A computing system configured to be coupled to a peripheral device comprising an input and an associated output is provided. The computing system comprises an input logical layer configured to receive descriptor configuration information from the peripheral device and build interface sets including attributes of the input of the peripheral device and the associated output. The input logical layer uses the interface sets to select and set attributes of the output of the peripheral device.

21 Claims, 4 Drawing Sheets

(56) References Cited

U.S. PATENT DOCUMENTS

| | | | |
|---|---|---|---|
| 6,067,074 A | | 5/2000 | Lueders |
| 6,359,572 B1 | | 3/2002 | Vale |
| 6,573,844 B1 | | 6/2003 | Venolia et al. |
| 6,621,424 B1 | | 9/2003 | Brand |
| 6,813,650 B1 | | 11/2004 | Cato et al. |
| 6,878,902 B2 | | 4/2005 | Lyle et al. |
| 6,907,577 B2 | | 6/2005 | Tervo |
| 6,909,602 B2 | | 6/2005 | Dietrich et al. |
| 6,940,490 B1 | * | 9/2005 | Kim et al. ............ 345/168 |
| 6,961,048 B2 | | 11/2005 | Mitchell |
| 6,970,109 B2 | | 11/2005 | Wolfson |
| 7,020,270 B1 | | 3/2006 | Ghassabian |
| 7,036,088 B2 | | 4/2006 | Tunney |
| 7,134,094 B2 | | 11/2006 | Stabb et al. |
| 7,161,587 B2 | | 1/2007 | Beck et al. |
| 7,301,532 B1 | | 11/2007 | Dobry |
| 7,305,368 B2 | | 12/2007 | Lieberman et al. |
| 7,327,559 B2 | | 2/2008 | Fox |
| 7,366,540 B2 | * | 4/2008 | Ansari et al. ............ 455/556.1 |
| 7,472,047 B2 | * | 12/2008 | Kramer et al. ............ 703/6 |
| 7,528,861 B2 | | 5/2009 | Kumagai et al. |
| 7,531,764 B1 | | 5/2009 | Lev et al. |
| 7,610,331 B1 | | 10/2009 | Genske et al. |
| 7,659,473 B2 | * | 2/2010 | Ramstein ............ 84/645 |
| 7,761,175 B2 | | 7/2010 | Gutowitz et al. |
| 7,818,153 B2 | * | 10/2010 | Kramer et al. ............ 703/6 |
| 7,899,325 B2 | | 3/2011 | Dickson et al. |
| 8,022,942 B2 | | 9/2011 | Bathiche et al. |
| 8,130,197 B2 | | 3/2012 | Atzmon |
| 8,358,277 B2 | * | 1/2013 | Mosby et al. ............ 345/173 |
| 8,519,949 B2 | * | 8/2013 | Ross et al. ............ 345/156 |
| 2002/0084919 A1 | | 7/2002 | Green |
| 2002/0093690 A1 | | 7/2002 | Satoh |
| 2003/0011503 A1 | * | 1/2003 | Levenson ............ 341/200 |
| 2003/0201972 A1 | | 10/2003 | Usuda |
| 2004/0212595 A1 | | 10/2004 | Zhou |
| 2004/0239638 A1 | | 12/2004 | Swanson et al. |
| 2005/0179565 A1 | * | 8/2005 | Mase et al. ............ 341/21 |
| 2005/0278521 A1 | | 12/2005 | Hirai |
| 2006/0022951 A1 | * | 2/2006 | Hull ............ 345/170 |
| 2006/0161701 A1 | | 7/2006 | Park |
| 2007/0002026 A1 | | 1/2007 | Sadler et al. |
| 2008/0131184 A1 | | 6/2008 | Brown et al. |
| 2008/0266145 A1 | | 10/2008 | Verma et al. |
| 2008/0316171 A1 | * | 12/2008 | Shahoian et al. ............ 345/158 |
| 2009/0069081 A1 | * | 3/2009 | Thorner ............ 463/30 |

OTHER PUBLICATIONS

Reply Non-Final Office Action cited in U.S. Appl. No. 12/142,818 dated Dec. 17, 2010, 9 pgs.
Final Office Action cited in U.S. Appl. No. 12/142,818 dated Jan. 25, 2011, 12 pgs.
Reply Final Office Action cited in U.S. Appl. No. 12/142,818 dated Apr. 25, 2011, 10 pgs.
Non-Final Office Action cited in U.S. Appl. No. 12/142,818 dated May 10, 2011, 11 pgs.
Reply Non-Final Office Action cited in U.S. Appl. No. 12/142,818 dated Aug. 10, 2011, 11 pages.
Final Office Action cited in U.S. Appl. No. 12/142,818 dated Nov. 17, 2011, 18 pages.
Reply Final Office Action cited in U.S. Appl. No. 12/142,818 dated Feb. 17, 2012, 12 pages.
Non-Final Office Action cited in U.S. Appl. No. 12/142,818 dated Apr. 18, 2012, 12 pages.
Reply Non-Final Office Action cited in U.S. Appl. No. 12/142,818 dated Jul. 18, 2012, 10 pages.
Restriction/Election Office Action cited in U.S. Appl. No. 12/142,818 dated Jul. 25, 2012, 6 pages.
Reply Restriction/Election Office Action cited in U.S. Appl. No. 12/142,818 dated Aug. 27, 2012, 8 pages.
Final Office Action cited in U.S. Appl. No. 12/142,818 dated Dec. 4, 2012, 10 pages.
International Search Report cited in PCT Application No. PCT/US2009/043372 dated Dec. 16, 2009, 11 pages.
International Preliminary Report cited in PCT Application No. PCT/US2009/043372 dated Dec. 21, 2010, 5 pages.
First Chinese Office Action cited in Chinese Application No. 2009/80123540.6 dated Aug. 28, 2012, 9 pages.
Reply to First Chinese Office Action cited in Chinese Application No. 2009/80123540.6 dated Dec. 27, 2012, 10 pages.
Second Chinese Office Action cited in Chinese Application No. 2009/80123540.6 dated Apr. 3, 2013, 7 pages.
Reply Second Chinese Office Action cited in Chinese Application No. 2009/80123540.6 dated May 24, 2013, 13 pages.
EP Search Report cited in EP Application No. 09767205.9 dated Oct. 17, 2011, 7 pages.
EP Communication cited in EP Application No. 09767205.9 dated Nov. 3, 2011, 1 page.
Reply EP Communication cited in EP Application No. 09767205.9 dated Dec. 23, 2011, 10 pages.
EP Office Action cited in EP Application No. 09767205.9 dated Mar. 18, 2013, 3 pages.
"VirtualKB 2.0b," Dec. 11, 2000, reprinted from the Internet at: http://www.palmblvd.com/software/pc/VirtualKB-2000-12-11-palm-pc.html, 4 pages.
"Hands-On with Optimus Maximus (At Last!)—Endgadget," Paul Miller, Nov. 21, 2007, reprinted from the Internet at: http://www.engadget.com/2007/11/21/hands-on-with-optimus-maximus-at-last/, 8 pages.
Optimus Maximus in Minimus Sub-$1000 Configurations-Endgadget, Thomas Ricker, Nov. 21, 2007, reprinted from the Internet at: http://www.engadget.com/2007/11/28/optimus-maximus-in-minimus-sub-1000-configurations/, 8 pages.
"Keyboard Access to Menus—Menu Programming Considerations," 2008, Reprinted from the Internet at http://msdn.microsoft.com/en-us/library/ms647557(VS.85,printer).aspx, 5 pages.
"Role of the Keyboard UI in Accessibility—Guidelines for Keyboard User Interface Design," Apr. 2002, Reprinted from the Internet at: http://msdn.microsoft.com/en-us/library/ms971323.aspx, 27 pages.
Third Chinese Office Action cited in Chinese Application No. 200980123540.6 dated Aug. 28, 2013, 7 pgs.
Reply Third Chinese Office Action cited in Chinese Application No. 200980123540.6 dated Nov. 1, 2013, 12 pgs.
Reply EP Communication cited in EP Application No. 09767205.9 dated Jul. 29, 2013, 2 pgs.

\* cited by examiner

Fig. 1

```
Collection [Keyboard]
    Logical Collection
        Input "a"
        Output "Display" 8 x 8
        Output "Height"
        Output "Temperature"
        Physical "0,1,2" (x,y,z coordinates)
    End Logical Collection Logical Collection
        Input "b"
        Output "Display" 8 x 8
        Output "Height"
        Output "Temperature"
        Physical "0,1,3" (x,y,z coordinates)
    End Logical Collection

...

Logical Collection
        Input "last"
        Output "Display" 8 x 8
        Output "Height"
        Output "Temperature"
        Physical "0,10,30" (x,y,z coordinates)
    End Logical Collection

END

Collection [Mouse]
    Logical Collection
        Input " "
        Output "Display" 8 x 8
        Output "Height"
        Output "Temperature"
        Physical "0,1,2" (x,y,z coordinates)
    End Logical Collection
END

SYSTEM METHOD FOR ASSOCIATING AN APPLICATION RUNNNG ON COMPUTING SYSTEM BY SELECTIVELY ALTERING AN ATTRIBUTE OF THE INPUT AND OUTPUT OF CONNECTED PERIPHERAL DEVICE

RELATED APPLICATION

This application is a continuation of U.S. application Ser. No. 12/142,818, filed on Jun. 20, 2008, entitled "ASSOCIATION OF AN INPUT AND OUTPUT OF A PERIPHERAL DEVICE IN A COMPUTING SYSTEM", at least some of which may be incorporated herein.

BACKGROUND

Many peripheral devices include both inputs and outputs that are not associated with each other. An application instantiated on a computing system coupled to the peripheral devices may not have access to the association of the input and the output of the peripheral device.

SUMMARY

Implementations described and claimed herein address the foregoing problems by allowing for association of an output of a peripheral device with an input of that peripheral device in a computing system. The association of the output with the input of the peripheral device provides an ability to link the associated input and output of the peripheral device in a computing system. An application instantiated on the computing system may use the association of the input and output capabilities of the peripheral device.

In one implementation, for example, descriptor information of a peripheral device is received from a coupled peripheral device. The descriptor information describes attributes of the peripheral device and an association between an input of the peripheral device and an output of the peripheral device. Peripheral device classes of associated input attributes including associated output attributes of the peripheral device are provided and an instantiated application is informed of attributes of the peripheral device through classes.

In another implementation, an interface layer is provided comprising associated input attributes and output attributes of an associated device. An input logical layer is used to access attributes of an interface layer for an input of the peripheral device including associated output attributes of the peripheral device. An attribute associated with the peripheral device is selected and set.

In yet another implementation, for example, descriptor information of a peripheral device is received and used to build interface sets including attributes of an input and an associated output of the peripheral device. The interface sets may be used to select and set attributes of the peripheral device.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

A computing system for associating an output of a peripheral device with an input of that peripheral device is provided.

Figure 1:
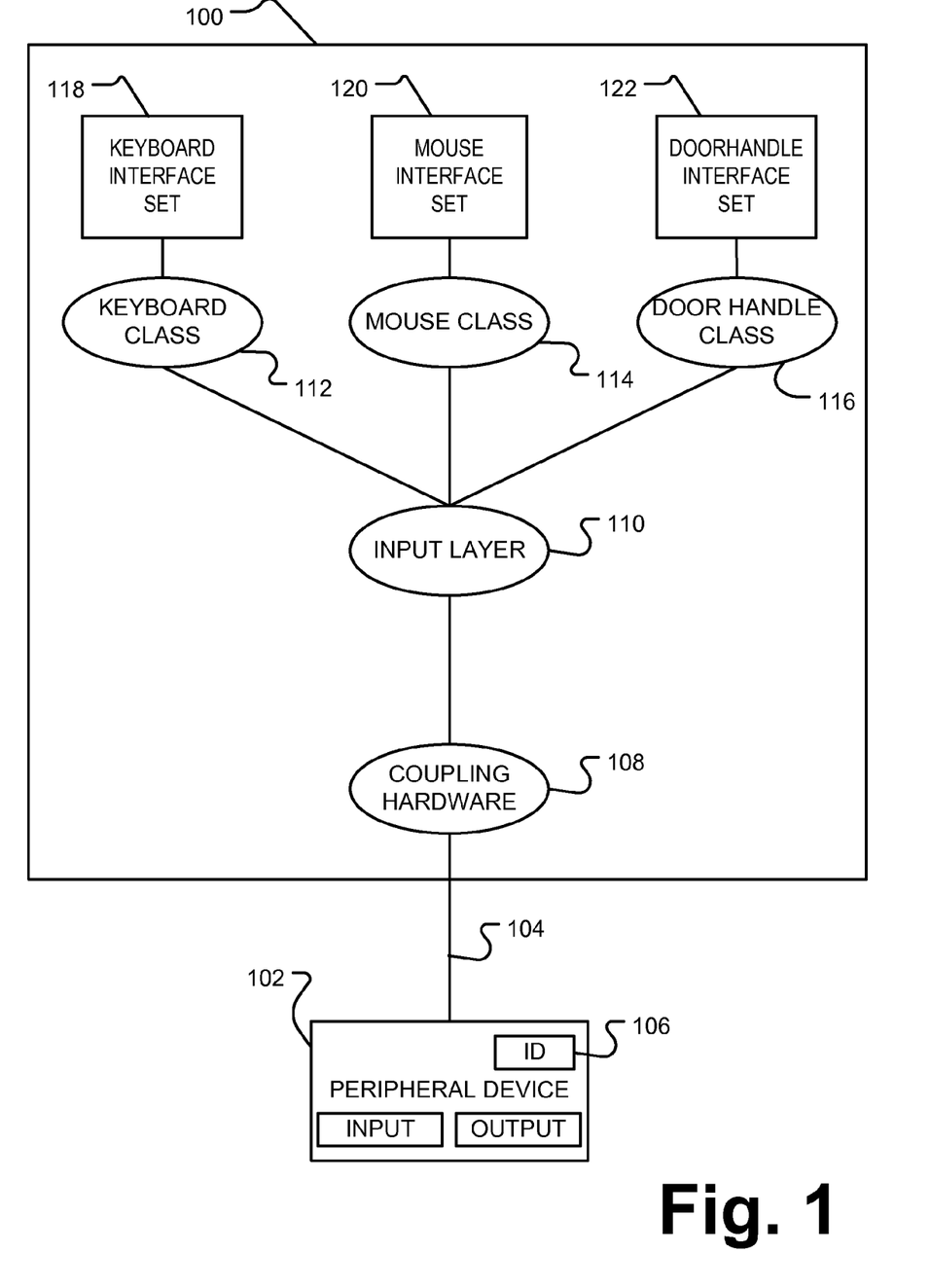
FIG. 1 depicts a schematic diagram of an example implementation of a computing system for associating an output of a peripheral device with an input of that peripheral device.

FIG. 1 depicts an example computing system 100 that associates output capabilities of a peripheral device 102 with input attributes of that peripheral device 102. The computing system 100 is coupled to at least one peripheral device 102. The peripheral device 102 comprises at least one input capability and at least one output capability that can be associated with that input capability.

The peripheral device 102 may comprise any type of peripheral device that may be coupled to the computing system 100. The peripheral device 102 may comprise, for example, a typical peripheral input device for a desktop or laptop computer, such as a keyboard, a mouse, a joystick, a game controller, a tablet screen, a web camera, a microphone, an external storage device, or other computer input/output peripheral device. The peripheral device 102 may also comprise a peripheral device to any other type of computing system, such as a mobile telephone, a security system, a vehicle or airplane control system, or any other type of computing system. The peripheral device 102 may, for example, comprise a peripheral device to an automobile computing system, such as an identification (e.g., bio-identification or keypad) module, an entry door handle, a button, a touch pad or screen, or any other type of peripheral device that may be coupled to and controlled by the computing system 100.

The peripheral device 102 may be coupled to the computing system 100 in any manner, such as via a wired or wireless link 104. The peripheral device 102 may be integral with the computing system 100 (e.g., a laptop computer or mobile telephone keyboard) or removably coupled to the computing system 100 via a wireless or wired connection (e.g., an IEEE 802.11 wireless peripheral device, a Bluetooth wireless peripheral device, a radio frequency wireless peripheral device, a serial peripheral device, a universal serial bus (USB) peripheral device (e.g., a human interface device (HID) such as a keyboard, a mouse, or a joy stick), a camera, an external storage device, a microphone, or the like).

A peripheral device 102 may include any number of inputs associated with any number of outputs on the peripheral device 102. A keyboard peripheral device, for example, may comprise a number of input keys (e.g., a QWERTY, Dvorak, T-9 or other keyboard) that may be associated with any number of outputs that may be controlled by the computing system 100 under the control of the input logical layer 110. One or more outputs of the keyboard may be associated with an input of the keyboard.

In one implementation, for example, a height of a particular key or group of keys may be raised or lowered to raise or lower their profile relative to other keys on the keyboard. On a locked mobile telephone keyboard, for example, keys used to unlock the keyboard may be lowered to reduce the chance of having the keys inadvertently pressed. In another implementation, as one or more modifier keys (e.g., "CTRL," "ALT," "FN," "ALTGR," or other modifier keys) are pressed, keys that correspond to that particular key may be raised in height and/or keys that do not correspond to a particular modifier key may be lowered in height to indicate which keys are expected to be depressed.

One or more displays on the peripheral device may also be used to indicate current settings, likely keystroke combinations, or other information. Displays on a keyboard may show current settings for the keyboard (e.g., fonts, colors, uppercase, lowercase). The displays may be located on individual keys of the keyboard or on another portion of the display. Similar to key height outputs described above, the displays may also be used to indicate likely keystrokes (e.g., when a modifier key has been depressed or where an application predicts likely keystroke combinations) or other settings (e.g., a "key lock-out" feature that prevents repetitive otherwise unwanted keystroke combinations).

Other peripheral devices may also include any number of outputs that may be associated with an input of the device. On a mouse, for example, a button of the mouse may be raised when a cursor controlled by the mouse is over a link that may be selected by use of that button and/or lowered when the cursor is not over such a link.

An access peripheral device (e.g., a door handle of an automobile or a secured doorway) may be controlled to allow access by controlling one or more output of the peripheral device. When a user is deemed to be an authorized user, a door handle or other access peripheral device, may be controlled to allow access. A door handle may be retracted when access is to be prevented and/or extended to an accessible position when access is permitted. In another implementation, a temperature of a button for a climate control system (e.g., on a house thermostat or an automobile climate control system) may be controlled to indicate to a user if it will increase or decrease a temperature set point of the climate control system.

An input and/or an output of the peripheral device 102 may be static or dynamic. A static input or output, for example, may comprise an input or output that is used for a single purpose, while a dynamic input or output may change functions depending upon one or more conditions of the computing system 100. A dynamic button in an automobile computing system, for example, may be used to initiate ignition of an engine when the automobile is off, while the same button may be used to control some other aspect of the automobile computing system when the engine is running. Similarly, a dynamic output associated with the button may be changed corresponding to the function of the input button at any given time.

These implementations of outputs that may be associated with an input of a peripheral device are merely examples. One skilled in the art would readily appreciate from this disclosure that any number of other types of peripheral devices may include any number of types of outputs that may be associated with one or more type of input of a peripheral device.

The peripheral device 102 is self-aware in that it comprises self-identifier configuration information 106 that may be used by the computing system 100 to associate an output capability of the peripheral device 102 with an input capability of the peripheral device 102. The peripheral device 102 is coupled to the computing system 100 via coupling hardware 108 (e.g., a port associated with the computing system 100, such as a serial port, a USB port, a parallel port, a wireless transceiver, or the like).

The self-identifier configuration information 106 may comprise, for example, a logical association between the output capability and the input capability of the peripheral device 102, physical attributes of the output or input device (e.g., a screen size, color capabilities, placement capabilities, movement capabilities, or other attributes).

An input logical layer 110 is provided in the computing system 100 for associating an output of the peripheral device 102 with an input of that peripheral device. The input logical layer 110 provides unified access to and control of different elements of the peripheral device 102 to an operating system running on the computing system 100. Where a keyboard peripheral device comprises a number of inputs and corresponding outputs, for example, the input logical layer 110 may provide an interface for accessing and controlling the inputs and outputs of the keyboard peripheral device.

In one implementation, for example, the input logical layer may link separate logical representations of devices, such as device classes or other representations. In the implementation shown in FIG. 1, for example, the computing system 100 comprises device classes for a keyboard 112, a mouse 114, and a door handle 116. In addition, for each class, the computing system 100 further comprises an interface set 118, 120, and 122 (e.g., an interface layer) including attributes for the corresponding device class. The interface set may comprise, for example, an application programming interface (API) set that includes attributes for the corresponding device class. API sets are just one example of an interface set that may be used. Other types of interface sets may also be used.

The input logical layer 110 may receive the self-identifier configuration information 106 from the peripheral device 102 and create the logical representations for the peripheral device 102. The input logical layer 110, for example, may receive a peripheral device class and configuration information identifying one or more inputs and outputs of the peripheral device 102 and generate an interface associating at least one output with an input of the peripheral device 102.

Figure 2:
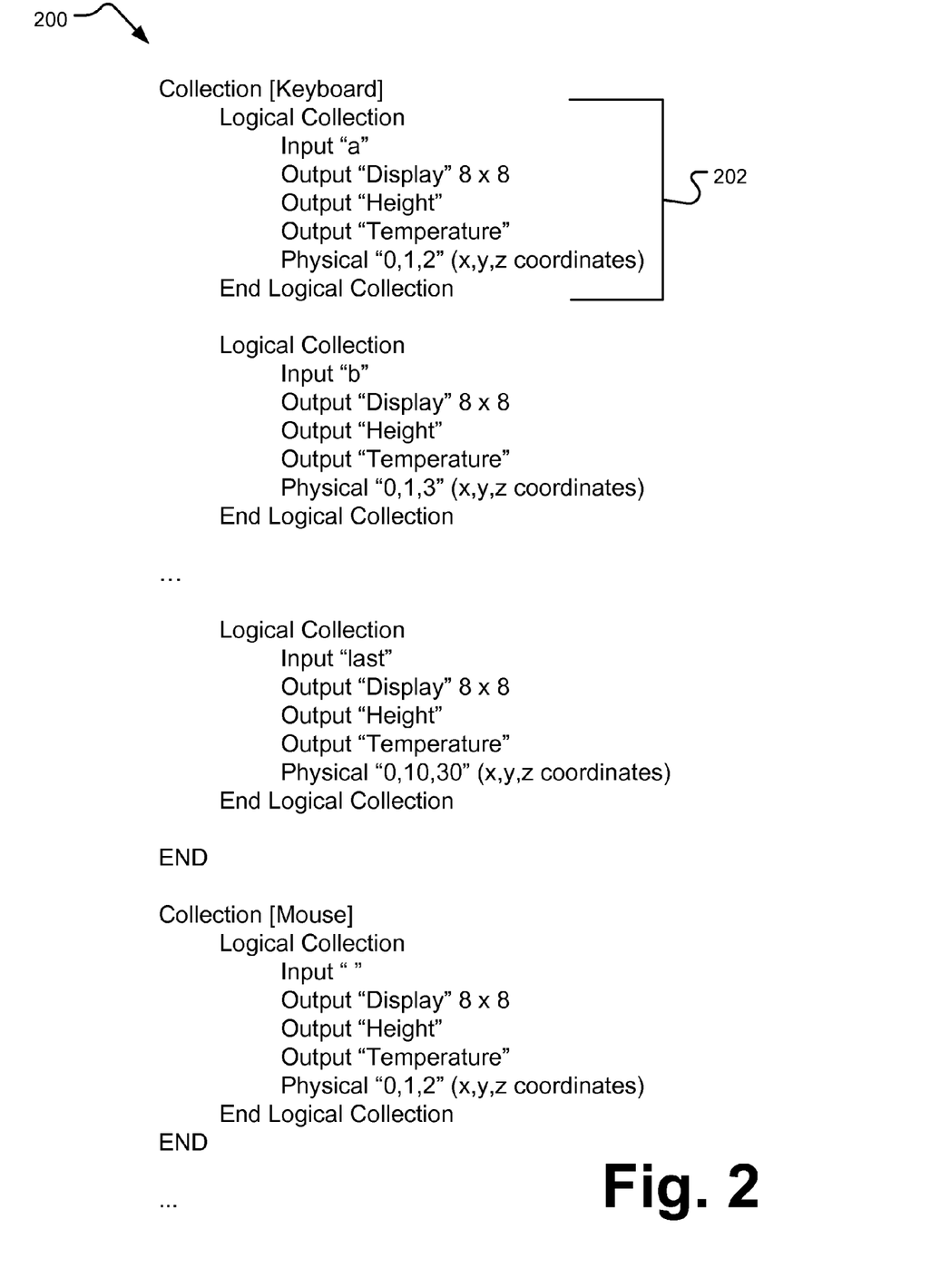
FIG. 2 depicts an example implementation of a data structure that may be used for associating an output of a peripheral device with an input of that peripheral device.

FIG. 2 depicts an example data structure 200 of an input logical layer for a human interface device (HID) peripheral device that may be used with a computing system for associating output capabilities of a peripheral device with input attributes of that peripheral device. As shown in FIG. 2, the example data structure 200 comprises logical collections for peripheral devices associating inputs and outputs of the peripheral devices. In the implementation shown in FIG. 2, the data structure 200 comprises a logical collection for each input of the peripheral device. A logical collection for a keyboard input "a" 202, for example, comprises an input identifier together with example outputs that may be associated with that input. In this example, the logical collection 202 corresponding to an input "a" comprises output identifiers corresponding to a "Display," a "Height," and a "Temperature." Other output identifiers are of course possible. A physical location of the input and/or each associated output may also be provided, such as shown in FIG. 2.

In this implementation, the input logical layer may utilize the data structure 200 to identify and control one or more outputs corresponding to a particular input of a peripheral device coupled to a computer system. An application may, for example, utilize the logical input layer to control an output on the peripheral device corresponding to a particular input of the peripheral device. An application running on a computing system may, for example, direct the input logical layer to alter a height, temperature, and/or a display associated with an input key "a" of the keyboard peripheral device.

The data structure 200 shown in FIG. 2, however, is merely one example of a data structure that may be used. Other data structures, such as an XML schema data structure, may also be used.

Figure 3:
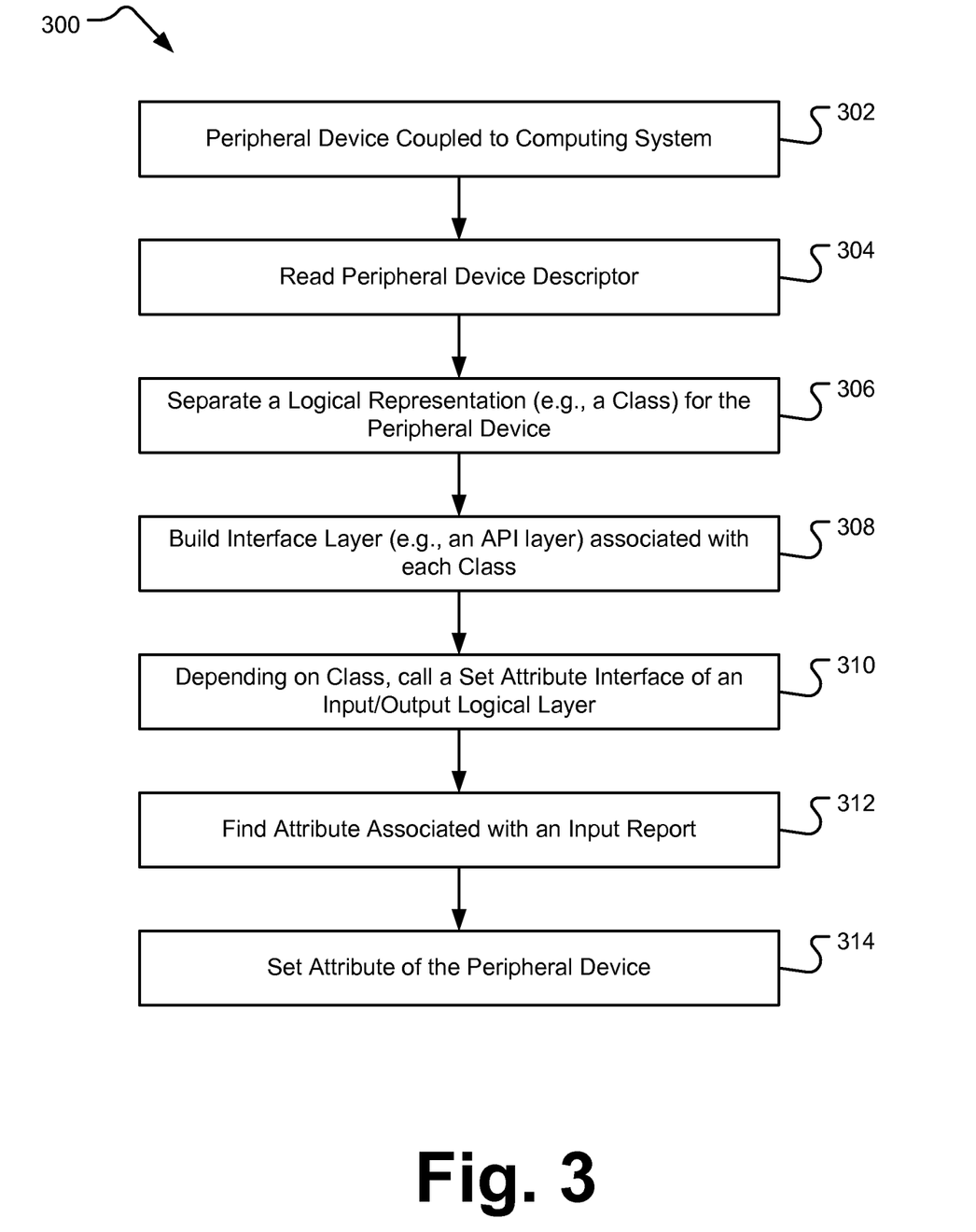
FIG. 3 depicts example operations for associating an output of a peripheral device with an input of that peripheral device in a computing system.

FIG. 3 depicts an example process 300 for associating an output of a peripheral device with an input of that peripheral device in a computing system. In the process 300, a peripheral device comprising at least one input and at least one output is coupled to the computing system in operation 302. The computing system reads a descriptor for each input and output of the peripheral device in operation 304. The descriptor may, for example, include the capability of each input and output and may further include attributes (e.g., a static or dynamic attribute) for each input and output of the peripheral device. An input logical layer of the computing system separates logical representations of a class or other the top level of a peripheral device (e.g., a keyboard, a mouse, a joy stick, a door handle, or the like) in operation 306. The input logical layer can also build an interface set (e.g., an API layer) associated with each class of the peripheral device in operation 308. Operations 302, 304, 306, and 308 may comprise a set-up operation that may or may not be repeated in subsequent operations after the peripheral device has previously been coupled to the computing system.

Depending on the class or other logical designation of the peripheral device, the input logical layer of the computing system may call the set attribute API of an input attribute logical layer in operation 310. The input logical layer may also determine an attribute associated with an input report in operation 312. The input logical layer may also set an attribute of the peripheral device in operation 314. In one implementation, for example, the input logical layer may send information over a bus, may send a state change request to a cache or other data storage held in the peripheral device, send state information to the peripheral device to prepopulate the cache or other data storage of the peripheral device for a specific application, or set an attribute of the peripheral device via another method. In some various implementations, for example, a keyboard peripheral device may be set for various math sets, music sets, symbol translations for foreign languages and outputs of the keyboard peripheral device may be used to identify the variations of the inputs of the keyboard. The individual keys of the keyboard peripheral device may each comprise a display that may be altered to display various math sets, music sets, or language sets that could be used with the keyboard peripheral device.

One or more output of a peripheral device may be associated with an input of that peripheral device. In one example, a keyboard modifier key (e.g., "CTRL," "ALT," "FN," "ALTGR," or other modifier keys) may be associated with outputs identifying acceptable keys of a limited entry set that may correspond to a latched modifier key. The limited entry set, for example, may include keys that correspond to features of a menu. When an "ALT" modifier key is latched in Microsoft® Word, for example, an output for the keys corresponding to selections available in the menu (e.g., "F" for "File," "E" for "Edit," and the like) may be activated to identify to a user what keystrokes will perform an identified function. The outputs for the limited entry set of keys may, for example, be highlighted (e.g., displaying a different appearance (e.g., a color), position (e.g., a raised height), feel (e.g., a tactile identifier such as a vibration or bump), and the like). Similarly, outputs corresponding to keyboard shortcuts (e.g., when data has been copied and is available to be inserted or pasted) or predicted keystrokes may also be activated.

In other examples, a plurality of keys may be grouped together to provide a larger keyset for providing easier input (e.g., in a physical accommodation, a gaming environment, where a full keyset is not required, or the like). Further, outputs (e.g., displays) on the individual keys may display which particular keys are grouped together and what the group collectively represents. A group of keys may be collectively illuminated with a common color, or other representation, to identify the keys as being grouped together. Further, a display may further indicate an input for which the group of keys will collectively represent (e.g., a group of keys may collectively represent a single letter, number, function, command, or other input).

In a keyboard, font and/or case changes may be directly represented on keys of a keyboard. Displays on the individual keys may show a true representation of how a particular key would be represented in a selected font. Where a Times New Roman font has been selected in an application, for example, keys of a keyboard may show how individual keys would be displayed in that font. Similarly, displays on the keys may show cases of letters depending on whether a "CAPS LOCK" key is activated or if a "SHIFT" key is latched. Also, displays on the keys may indicate functions that may be selected when a "FN" key is latched. Other indications are also possible.

Where particular keys or combinations of keys are expected or required (e.g., a "CTRL," "ALT," "DEL" combination is required), those keys may be highlighted (e.g., through a display, position, feel, or other manner) and/or other keys may be dimmed or otherwise given a lower profile (e.g., retracted).

"Timeout" or "lockout" sequences may also be indicated through displays on keys of a keyboard. Where repetitive striking of a key is disabled within a time period, for example, one or more displays on the keyboard may be used to indicate that the key is being locked. When a particular key is latched, for example, the key may be highlighted for a predetermined time period to indicate that the key is locked from receiving a further input during that time period. Displays on one or more keys may further be used to indicate that the time out is subsiding (e.g., an initial display indicating that the key is latched and a decay sequence to indicate the time out is subsiding).

Invalid inputs on a keyboard may also be indicated to a user via one or more output on a keyboard. Outputs of a peripheral device may visually, spatially, tactiley, or otherwise indicate that an invalid input has been received from that device.

Graphic or other representations of particular available function may also be represented on an output of a peripheral device corresponding to a particular input of that peripheral device. A display on a key of a keyboard, for example, may depict a graphical representation (e.g., an icon) that corresponds to a particular function available by activation of a key of the keyboard.

In a gaming or other environment, outputs of a peripheral device may be used to augment input options of the peripheral device. In one implementation, contextual clues based on a game or educational application may be provided. A "hint" mode in a maze game, for example, may activate displays showing valid navigational inputs (e.g., keys) that may be used to navigate the maze. Similarly, inputs of a peripheral device may be altered depending upon certain situations. In a role playing game, for example, a heightened sense of awareness may be accomplished by making inputs easier while a reduced sense of awareness (e.g., an intoxicated, drugged, or impaired character) may be accomplished by making user inputs of the peripheral device more difficult. Inputs of the peripheral device, for example, may indicate more or less information than would otherwise be provided. Further, layout of inputs may be altered to make input easier or more difficult depending on the conditions present in the game. Keys or other input devices may be raised or lowered in profile, highlighted or hidden, given more or less resistance, moved or assigned different values, or the like depending upon the conditions of the game. Combinations of input entry in a game may also be predicted and highlighted or diminished depending upon the circumstances.

In an education application, e.g., a typing or musical instrument tutorial application, input devices may be augmented by output capabilities of the peripheral device. Predictive or desired inputs may be identified to aid a user in learning correct inputs or combinations of inputs.

While particular examples may be given for one or more particular implementation of a peripheral device, such as for a keyboard, similar functionalities or capabilities may also be used with respect to other types of peripheral devices.

Figure 4:
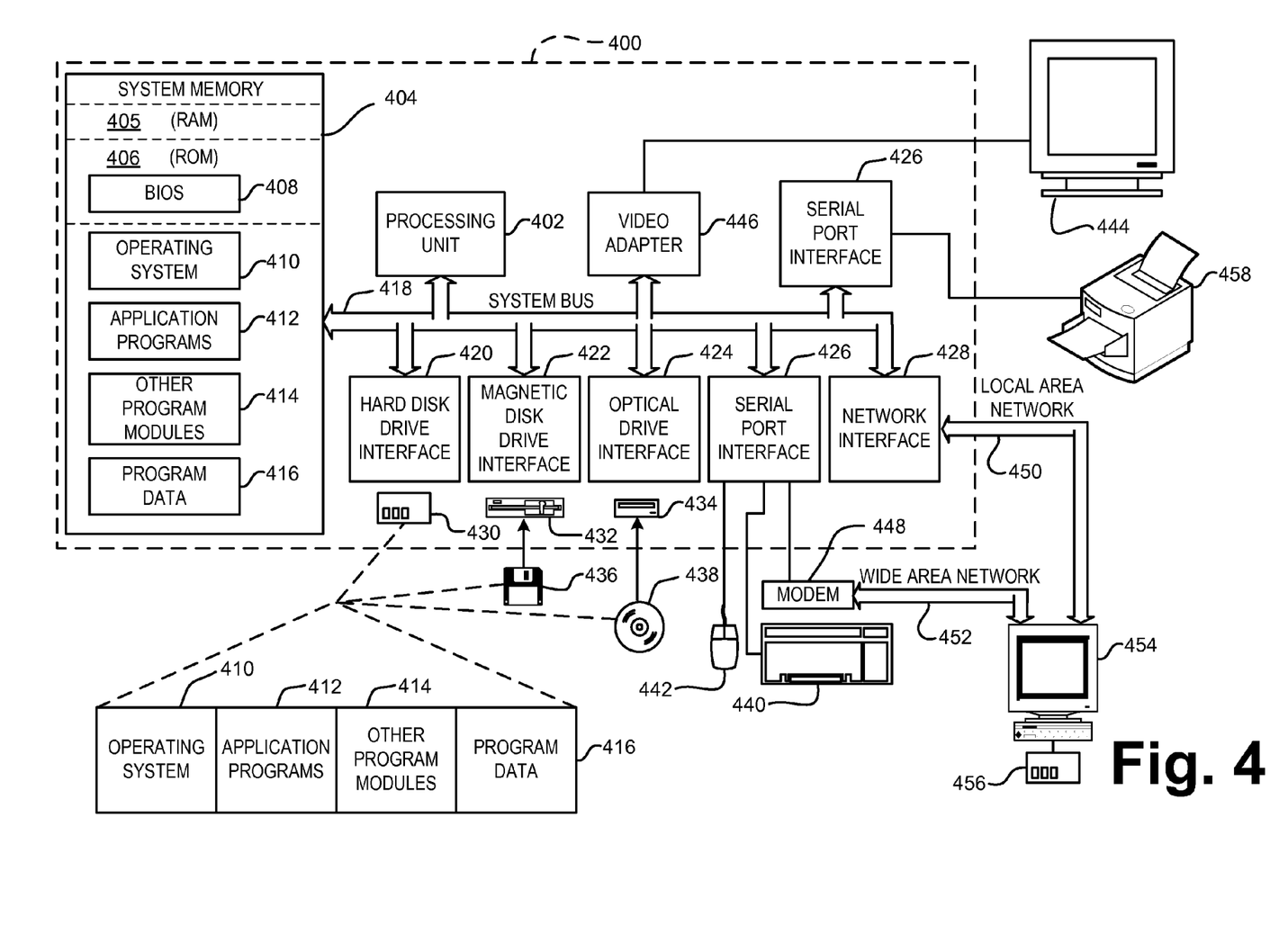
FIG. 4 depicts a schematic diagram of a general purpose computing system for implementing aspects of the computing system.

An example of a hardware and operating environment of FIG. 4 for implementing operations to associate an output of a peripheral device coupled to a computing system with an input of that peripheral device includes a general purpose computing device in the form of a computer 400, including a processing unit 402, a system memory 404, and a system bus 418 that operatively couples various system components, including the system memory 404 to the processing unit 402. There may be only one or there may be more than one processing unit 402, such that the processor of computer 400 comprises a single central processing unit (CPU), or a plurality of processing units, commonly referred to as a parallel processing environment. The computer 400 may be a conventional computer, a distributed computer, or any other type of computer; the disclosed subject matter is not so limited.

The system bus 418 may be any of several types of bus structures including a memory bus or memory controller, a peripheral bus, a switched fabric, point-to-point connections, and a local bus using any of a variety of bus architectures. The system memory 404 may also be referred to as simply the memory, and includes read only memory (ROM) 406 and random access memory (RAM) 405. A basic input/output system (BIOS) 408, containing the basic routines that help to transfer information between elements within the computer 400, such as during start-up, is stored in ROM 406. The computer 400 further includes a hard disk drive 430 for reading from and writing to a hard disk, not shown, a magnetic disk drive 432 for reading from or writing to a removable magnetic disk 436, and an optical disk drive 434 for reading from or writing to a removable optical disk 438 such as a CD ROM or other optical media.

The hard disk drive 430, magnetic disk drive 432, and optical disk drive 434 are connected to the system bus 418 by a hard disk drive interface 420, a magnetic disk drive interface 422, and an optical disk drive interface 424, respectively. The drives and their associated computer-readable media provide nonvolatile storage of computer-readable instructions, data structures, program modules and other data for the computer 400. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 430, magnetic disk 432, optical disk 434, ROM 406, or RAM 405, including an operating system 410, one or more application programs 412, other program modules 414, and program data 416. In an exemplary implementation, a method for associating an output of a peripheral device with an input of the peripheral device, may be incorporated as part of the operating system 410, application programs 412, or other program modules 414.

A user may enter commands and information into the personal computer 400 through input devices such as a keyboard 440 and pointing device 442, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 402 through a serial port interface 426 that is coupled to the system bus 418, but may be connected by other interfaces, such as a parallel port, game port, or a universal serial bus (USB).

A monitor 444 or other type of display device is also connected to the system bus 418 via an interface, such as a video adapter 446. In addition to the monitor 444, computers typically include other peripheral output devices, such as a printer 458 and speakers (not shown). These and other output devices are often connected to the processing unit 402 through the serial port interface 426 that is coupled to the system bus 418, but may be connected by other interfaces, such as a parallel port, game port, or a universal serial bus (USB). A media tuner module 460 may also be connected to the system bus 418 to tune audio and video programming (e.g., TV programming) for output through the video adapter 446 or other presentation output modules.

The computer 400 may operate in a networked environment using logical connections to one or more remote computers, such as remote computer 454. These logical connections may be achieved by a communication device coupled to or integral with the computer 400; the disclosed subject matter is not limited to a particular type of communications device. The remote computer 454 may be another computer, a server, a router, a network personal computer, a client, a peer device, or other common network node, and typically includes many or all of the elements described above relative to the computer 400, although only a memory storage device 456 has been illustrated in FIG. 4. The logical connections depicted in FIG. 4 include a local-area network (LAN) 450 and a wide-area network (WAN) 452. Such networking environments are commonplace in office networks, enterprise-wide computer networks, intranets and the Internet, which are all types of networks.

When used in a LAN 450 environment, the computer 400 may be connected to the local network 450 through a network interface or adapter 428, e.g., Ethernet or other communications interfaces. When used in a WAN 452 environment, the computer 400 typically includes a modem 448, a network adapter, or any other type of communications device for establishing communications over the wide area network 452. The modem 448, which may be internal or external, is connected to the system bus 418 via the serial port interface 426. In a networked environment, program modules depicted relative to the personal computer 400, or portions thereof, may be stored in a remote memory storage device. It is appreciated that the network connections shown are exemplary and other means of and communications devices for establishing a communications link between the computers may be used.

In an example implementation, an input logical layer module and other modules may be embodied by instructions stored in memory 422 and/or storage devices 429 or 431 and processed by the processing unit 421. Logical representations, device interface data sets, and other data may be stored in memory 422 and/or storage devices 429 or 431 as persistent datastores.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the disclosed subject matter. Although various embodiments of the disclosed subject matter have been described above with a certain degree of particularity, or with reference to one or more individual embodiments, those skilled in the art could make numerous alterations to the disclosed embodiments without departing from the spirit or scope of this disclosed subject matter. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosed subject matter as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A computing system, comprising:
   one or more processing units;
   memory comprising executable instructions which, when executed by at least one of the one or more processing units, cause the computing system to be configured with an architecture that causes the computing system to associate an output of a peripheral device with an input of the peripheral device in order to provide an application running at the computing system with access to the associated input and output of the peripheral device, by performing the following computer-implemented process:
   receive at an input logical layer self-identifier information from a peripheral device connected to the computing system through a hardware coupling, wherein the self-identifier information comprises class and configuration information for the connected peripheral device;
   use the input logical layer to generate, based on the class and configuration information, an interface associating at least one output with an input of the connected peripheral device;
   use the input logical layer to link a logical representation of the connected peripheral device to the generated interface;
   use a data structure of the input logical layer to identify and control one or more outputs corresponding to a particular input of the connected peripheral device, in order to selectively alter an attribute of the one or more outputs of the connected peripheral device by performing at least one of the following:
   altering a resistance associated with the one or more identified outputs corresponding to the particular input;
   altering a height associated with the one or more identified outputs corresponding to the particular input; and
   altering a temperature associated with the one or more identified outputs corresponding to the particular input.

2. The computing system of claim 1, wherein the peripheral device comprises a keyboard.

3. The computing system of claim 1, wherein the altered attribute corresponds to a level of a sense of awareness associated with the application running at the computing system.

4. The computing system of claim 2, wherein the selectively altered attribute comprises
   decreasing the resistance a key responsive to determining that the peripheral device is associated with the acceptable input to the application; and
   increasing the resistance of a key responsive to determining that the peripheral device is associated with an unacceptable input to the application.

5. The computing system of claim 2, wherein the selectively altered attribute comprises altering a temperature of a key of the peripheral device.

6. The computing system of claim 2, wherein the selectively altered attribute comprises altering the height of a key on the keyboard.

7. The computing system of claim 1, wherein the data structure comprises logical collections for peripheral devices associating inputs and outputs of the peripheral device based on class of a peripheral device.

8. A computer-implemented method for associating an output of a peripheral device with an input of the peripheral device in order to provide an application running at a computing system with access to the associated input and output of the peripheral device when connected to the computing system, the computer-implemented method being performed by one or more processors executing computer executable instructions for the computer-implemented method, and the computer-implemented method comprising:
   receiving at an input logical layer self-identifier information from a peripheral device connected to the computing system through a hardware coupling, wherein the self-identifier information comprises class and configuration information for the connected peripheral device;
   based on the class and configuration information, generating at the input logical layer an interface associating at least one output with an input of the connected peripheral device;

linking a logical representation of the connected peripheral device to the generated interface;

using a data structure of the input logical layer to identify and control one or more outputs corresponding to a particular input of the connected peripheral device, in order to selectively alter an attribute of the one or more outputs of the connected peripheral device by performing at least one of the following:

altering a resistance associated with the one or more identified outputs corresponding to the particular input;

altering a height associated with the one or more identified outputs corresponding to the particular input; and     altering a temperature associated with the one or more identified outputs corresponding to the particular input.

9. The computer-implemented method of claim 8, wherein the peripheral device comprises a keyboard.

10. The computer-implemented method of claim 8, wherein the altered attribute corresponds to a level of a sense of awareness associated with the application running at the computing system.

11. The computer-implemented method of claim 9, wherein the selectively altered attribute comprises     decreasing the resistance a key responsive to determining that the peripheral device is associated with the acceptable input to the application; and     increasing the resistance of a key responsive to determining that the peripheral device is associated with an unacceptable input to the application.

12. The computer-implemented method of claim 9, wherein the selectively altered attribute comprises altering a temperature of a key of the peripheral device.

13. The computer-implemented method of claim 9, wherein the selectively altered attribute comprises altering the height of a key on the keyboard.

14. The computer-implemented method of claim 8, wherein the data structure comprises logical collections for peripheral devices associating inputs and outputs of the peripheral device based on class of a peripheral device.

15. A computer readable device comprising computer executable instructions which, when executed by one or more processors, cause the one or more processor to perform a computer-implemented method for associating an output of a peripheral device with an input of the peripheral device in order to provide an application running at a computing system with access to the associated input and output of the peripheral device when connected to the computing system, the computer-implemented method comprising:

receiving at an input logical layer self-identifier information from a peripheral device connected to the computing system through a hardware coupling, wherein the self-identifier information comprises class and configuration information for the connected peripheral device;

based on the class and configuration information, generating at the input logical layer an interface associating at least one output with an input of the connected peripheral device;

linking a logical representation of the connected peripheral device to the generated interface;

using a data structure of the input logical layer to identify and control one or more outputs corresponding to a particular input of the connected peripheral device, in order to selectively alter an attribute of the one or more outputs of the connected peripheral device by performing at least one of the following:

altering a resistance associated with the one or more identified outputs corresponding to the particular input;

altering a height associated with the one or more identified outputs corresponding to the particular input; and     altering a temperature associated with the one or more identified outputs corresponding to the particular input.

16. The computer readable device of claim 15, wherein the peripheral device comprises a keyboard.

17. The computer readable device of claim 15, wherein the altered attribute corresponds to a level of a sense of awareness associated with the application running at the computing system.

18. The computer readable device of claim 16, wherein the selectively altered attribute comprises     decreasing the resistance a key responsive to determining that the peripheral device is associated with the acceptable input to the application; and     increasing the resistance of a key responsive to determining that the peripheral device is associated with an unacceptable input to the application.

19. The computer readable medium of claim 16, wherein the selectively altered attribute comprises altering a temperature of a key of the peripheral device.

20. The computer readable medium of claim 16, wherein the selectively altered attribute comprises altering the height of a key on the keyboard.

21. The computer readable device of claim 15, wherein the data structure comprises logical collections for peripheral devices associating inputs and outputs of the peripheral device based on class of a peripheral device.

\* \* \* \* \*